United States Patent [19]

Holter et al.

[11] 4,297,117

[45] Oct. 27, 1981

[54] RESPIRATORY DEVICE FOR CATASTROPHIC FIRES AND/OR SMOG WEATHER CONDITIONS

[75] Inventors: Heinz Holter, Gladbeck; Heinz Gresch, Dortmund-Derne; Heinrich Igelbuscher, Gladbeck, all of Fed. Rep. of Germany

[73] Assignee: Industrie-Wert Beteiligungsgesellschaft mbH, Mainz, Fed. Rep. of Germany

[21] Appl. No.: 50,277

[22] Filed: Jun. 19, 1979

[30] Foreign Application Priority Data

Jun. 21, 1978 [DE] Fed. Rep. of Germany ....... 2827115
Aug. 28, 1978 [DE] Fed. Rep. of Germany ....... 2837469

[51] Int. Cl.[3] ...................... B01D 39/14; B01D 53/04; B01D 53/22

[52] U.S. Cl. ....................................... 55/389; 55/387; 55/279; 55/524; 55/DIG. 35; 128/205.27; 128/205.28; 128/206.19; 422/120

[58] Field of Search ...................... 128/202.26, 205.28, 128/205.29, 206.19, 205.27; 210/502, 503, 505, 492, 509; 55/316, 387, 279, 524, DIG. 33, DIG. 35, 527, 389; 422/120, 121; 206/803; 252/446, 447

[56] References Cited

U.S. PATENT DOCUMENTS

| | | | |
|---|---|---|---|
| 2,758,671 | 8/1956 | Silverman et al. | 55/527 |
| 2,821,261 | 1/1958 | Vixler et al. | 55/527 |
| 3,196,871 | 7/1965 | Hormats et al. | 128/205.28 |
| 3,475,189 | 10/1969 | Carter et al. | 252/446 |
| 3,971,373 | 7/1976 | Braun | 128/146.2 |
| 4,160,059 | 7/1979 | Samejima | 428/288 |

OTHER PUBLICATIONS

Fieldner, A. C. et al. "Gas Masks for Gases Met in Fighting Fires" Dep. of Interior, Bureau of Mines, Tech. Paper 248, 1921.

Katz, S. H. et al. "The Universal and the Fireman's Gas Masks" Dep. of Interior, Bureau of Mines, Tech. Paper 300, 1923.

*Primary Examiner*—Charles N. Hart
*Assistant Examiner*—David R. Sadowski
*Attorney, Agent, or Firm*—James C. Wray

[57] ABSTRACT

A fireproof respiratory face mask for use in fires and smog has a granular expanded calcium aluminum silicate base material coated with layers of soda lime, active carbon dust, copper dust soaked into a caustic soda solution and manganese dioxide dust held between two layers of ceramic fiber fleece-like materials felted together to hold the coated granules. The face mask is stored in an easy opening ceramic fiber fireproof package with a pair of fireproof gloves.

11 Claims, 1 Drawing Figure

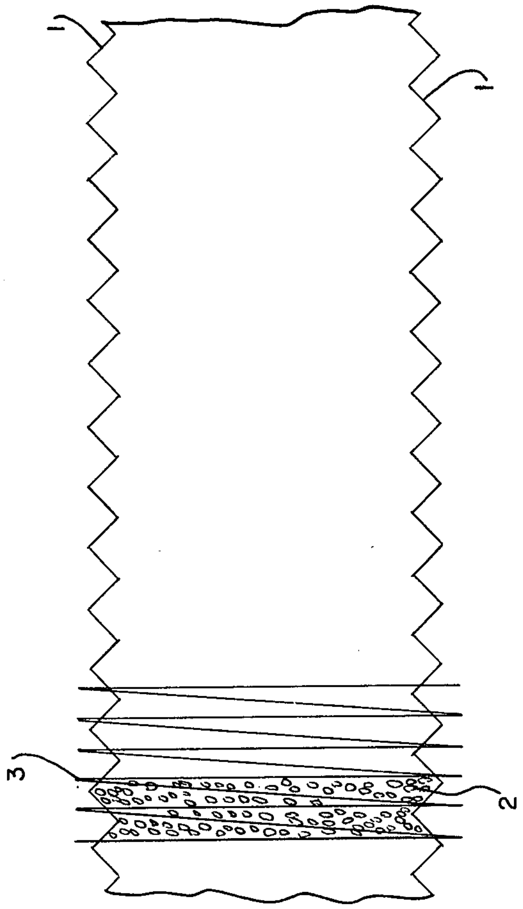
1
1
3
2

RESPIRATORY DEVICE FOR CATASTROPHIC FIRES AND/OR SMOG WEATHER CONDITIONS

BACKGROUND OF THE INVENTION

The invention is a respiratory device to be used during a catastrophic fire and/or smog weather conditions.

Respiratory devices are used by rescue squads, such as fire fighters and ambulance men. Usually they are equipped with respiratory devices such as breathing filters, oxygen apparatus, etc. However, those devices are technically rather sophisticated, because they are designed to be used several times, and therefore are expensive. For smog weather conditions, simplified breathing devices are known and are used in areas where smog frequently occurs. Such breathing filters, however, are not suitable as respiratory devices during catastrophic fires.

During catastrophic fires in large buildings, such as public buildings, hotels, sky scrapers and similar buildings, the problem is more frequently than not that persons being in those buildings are cut off from their escape, because on their way to escape they have to pass through rooms already on fire. The use of wet clothes or similar materials as a respiratory device is not sufficient in those cases to allow a safe escape. Usually those persons will suffer severe injury or even will faint from the noxious gases.

SUMMARY OF THE INVENTION

The invention provides a simple and economic respiratory device which can be easily stored in each room of a building or can be carried by persons, and which can be put on during fire or smog periods to protect the person at least for a limited time.

The solution is a respiratory device of the kind as described before, characterized by a fleece-like or felted material reinforced with an adsorption material consisting of soda lime, active carbon dust, copper dust and/or manganese dioxide dust.

Preferably the adsorption material can be deposited on a base material consisting of expanded calcium-aluminum-silicate. In such a case it is recommended to surround the particles of the base material with a layer of soda lime and a layer of active carbon as well as a layer of copper dust soaked into a caustic soda solution and/or a layer of manganese dioxide dust. It is advisable to use the manganese dioxide produced from potassium permanganate and reinforced with 5% copper oxide. For the structure of the fleece-like material, ceramic fibers should be used so that the material not only has good filter properties but also has high heat insulating efficiency.

Such a respiratory device can easily be produced as a cloth with eye openings to be worn as a face mask, which for example can be stored in hotel rooms or in rooms of large buildings. Such a face mask is easy to put on. Because of the excellent filter properties of the ceramic fibers making up the fleece-like materials, the face is also protected from direct heat influence.

Dust and drops of liquids will be retained because of the excellent filter properties. Noxious gases will be retained by the adsorption material.

Therefore, a person, by using such a face mask in case of a fire, and by additionally wetting his clothes (It is assumed that in case of a fire, normally the water supply system of a building is still functioning.) is able during the escape to pass through one or several rooms on fire or full of smoke, without suffering damage from heat and/or noxious gases.

It is understood that the cloth being used as a face mask is cut in such a way that at least the mouth and nose will be covered. The face mask will be held by hand, or the mask has an elastic band or some other fixation device that it can easily be put on.

It would be advantageous if this special cloth to be used as a face mask would be part of a fire protection escape package, which also would contain fireproof gloves, which will be put on by a person so that he can remove burning or hot obstacles blocking his escape. Such a fire protection package can be stored in an easy to open, fireproof parcel made of ceramic fibers.

In the following the invention will be described in more detail together with the drawing shown on a separate page.

BRIEF DESCRIPTION OF THE DRAWING

The drawing shows a partial cross-section of a respiratory device of a cloth with eye openings to be used as a face mask.

DETAILED DESCRIPTION OF THE DRAWING

The cloth shown on the drawing consists of two more or less parallel layers 1 which are made of a fleece-like material and ceramic fibers. Both layers 1 are specially linked with each other through a layer 2 of a granular base material. The such formed needle-like fibers 3 hold both layers 1 together and prevent the base material from shifting relative to the both layers 1 or from falling out from the gap between the both layers 1.

The base material consists of an expanded calcium-aluminum-silicate, where the adsorption material is deposited. In more detail, the grains of the base material will be surrounded with a layer of soda lime and a layer of active carbon as well as a layer of copper dust soaked into a caustic soda solution and/or a layer of manganese dioxide, where the manganese dioxide should be produced from potassium permanganate and should be reinforced with approximately 5% copper oxide.

Not shown on the drawing is that the cloth as described before has eye openings that make the cloth suitable as a face mask. An elastic head band or a similar fixation device can be attached to the cloth to ensure proper positioning of the face mask. This cloth can also be part of a fire protection escape package which can also contain fireproof gloves (not shown on drawing). The fire protection escape package can be stored in an easy to open, fireproof parcel made of ceramic fibers.

I claim:

1. A respiratory filter element for catastrophic fires and/or smog weather conditions characterized by a fleece-like material that is reinforced with adsorption materials comprising soda lime, active carbon dust, and either copper dust or manganese dioxide dust or both copper dust and manganese dioxide dust, and thus characterized in that the adsorption material is deposited on a base material made of expanded calcium-aluminum-silicate and that the base material is embedded in the fleece-like material.

2. A respiratory filter element according to claim 1 thus characterized that particles of the base material are surrounded with a layer of soda lime, a layer of active carbon, as well as either a layer of copper dust soaked in a caustic soda solution or a layer of manganese dioxide dust or both a layer of copper dust soaked in a caustic soda solution and a layer of manganese dioxide.

3. A respiratory filter element according to one of the claims 1–2 thus characterized that the manganese dioxide is produced from potassium permanganate and is reinforced with approximately 5% copper oxide.

4. A respiratory filter element according to one of the claims 1–2 thus characterized that the fleece-like material is made of ceramic fibers.

5. A respiratory filter element according to claim 1 characterized by a cloth with eye openings to be used as a face mask.

6. A respiratory filter element according to claim 1 thus characterized that said filter element is part of a fire protection escape package, which also contains fireproof gloves.

7. A respiratory filter element according to claim 6 thus characterized that this package is stored in an easy to open, fireproof parcel made of ceramic fibers.

8. A respiratory filter element according to claim 1 characterized by a second fleece-like material disposed on the first fleece-like material and holding therebetween the adsorption materials, with the fleece-like materials being linked with each other through the adsorption materials.

9. A respiratory filter element according to claim 1 further characterized by the fleece-like material including ceramic fibers, which fibers extend through the adsorption material and link fleece-like materials together and thus prevent the adsorption material from shifting relative to the fleece-like materials and from falling out from between the fleece-like materials.

10. A respiratory filter element comprising a cloth material configured for holding on a face and particularly about a nose and mouth for breathing air through the cloth material during escapes from catastrophic fires, the cloth material including plural parallel layers of fleece-like material and granular adsorption material held between the layers of fleece-like material, the layers of fleece-like material being linked through the granular material to prevent shifting of the granular material relative to the fleece-like material layers and to prevent the adsorption material from falling out from between the layers, wherein the granular adsorption material comprises an expanded base material with layers of soda lime, active carbon, copper dust soaked in a caustic soda solution and manganese dioxide.

11. The respiratory filter element according to claim 10 wherein the fleece-like material comprises ceramic fibers.

* * * * *